(12) United States Patent
Murakawa et al.

(10) Patent No.: US 11,626,222 B2
(45) Date of Patent: Apr. 11, 2023

(54) FERRITE SINTERED MAGNET AND ROTARY ELECTRICAL MACHINE COMPRISING THE SAME

(71) Applicant: TDK Corporation, Tokyo (JP)

(72) Inventors: Yoshitaka Murakawa, Tokyo (JP); Hiroyuki Morita, Tokyo (JP); Masanori Ikeda, Tokyo (JP); Shogo Muroya, Tokyo (JP); Tomokazu Ishikura, Tokyo (JP)

(73) Assignee: TDK Corporation, Tokyo (JP)

( * ) Notice: Subject to any disclaimer, the term of this patent is extended or adjusted under 35 U.S.C. 154(b) by 17 days.

(21) Appl. No.: 17/070,469

(22) Filed: Oct. 14, 2020

(65) Prior Publication Data

US 2021/0118598 A1 Apr. 22, 2021

(30) Foreign Application Priority Data

Oct. 18, 2019 (JP) .............................. JP2019-191279

(51) Int. Cl.
| | | |
|---|---|---|
| H01F 1/03 | (2006.01) | |
| H01F 1/11 | (2006.01) | |
| H01F 1/08 | (2006.01) | |
| C04B 35/26 | (2006.01) | |
| H01F 1/10 | (2006.01) | |

(52) U.S. Cl.
CPC ....... *H01F 1/0315* (2013.01); *C04B 35/2633* (2013.01); *C04B 35/2683* (2013.01); *H01F 1/086* (2013.01); *H01F 1/10* (2013.01); *H01F 1/11* (2013.01); *C04B 2235/3208* (2013.01); *C04B 2235/3241* (2013.01); *C04B 2235/3262* (2013.01); *C04B 2235/3409* (2013.01); *C04B 2235/3418* (2013.01); *C04B 2235/767* (2013.01); *C04B 2235/85* (2013.01)

(58) Field of Classification Search
CPC ......... H01F 1/11; H01F 1/10; C04B 35/2633; C04B 35/2683; C04B 2235/767; C04B 2235/3208; C04B 2235/3262; C04B 2235/3241; C04B 2235/3409; C04B 2235/3418; C04B 2235/85
See application file for complete search history.

(56) References Cited

U.S. PATENT DOCUMENTS

| | | | |
|---|---|---|---|
| 5,846,449 | A | 12/1998 | Taguchi et al. |
| 6,858,156 | B2 | 2/2005 | Takami et al. |
| 9,460,835 | B2 | 10/2016 | Taguchi |
| 9,514,871 | B2 | 12/2016 | Taguchi |
| 9,589,713 | B2 | 3/2017 | Murakawa et al. |
| 9,748,026 | B2 | 8/2017 | Shirata |
| 2009/0314981 | A1 | 12/2009 | Yanagida et al. |
| 2012/0105185 | A1 | 5/2012 | Oda et al. |
| 2012/0280167 | A1 | 11/2012 | Yanagida et al. |
| 2013/0285779 | A1* | 10/2013 | Kobayashi ......... C01G 49/0054 264/611 |
| 2014/0097378 | A1 | 4/2014 | Yanagida et al. |
| 2015/0053883 | A1 | 2/2015 | Taguchi |
| 2015/0235748 | A1 | 8/2015 | Kobayashi et al. |
| 2015/0255198 | A1 | 9/2015 | Murakawa et al. |
| 2015/0325350 | A1 | 11/2015 | Taguchi |
| 2015/0332819 | A1 | 11/2015 | Oda et al. |
| 2017/0207012 | A1 | 7/2017 | Morita |
| 2018/0277290 | A1 | 9/2018 | Kim et al. |
| 2019/0304643 | A1 | 10/2019 | Morita et al. |
| 2019/0318856 | A1 | 10/2019 | Nagaoka et al. |
| 2020/0312493 | A1 | 10/2020 | Murakawa et al. |
| 2020/0312494 | A1 | 10/2020 | Murakawa et al. |
| 2020/0312496 | A1 | 10/2020 | Murakawa et al. |

FOREIGN PATENT DOCUMENTS

| | | |
|---|---|---|
| CN | 104508769 A | 4/2015 |
| CN | 104900363 A | 9/2015 |
| CN | 104973858 A | 10/2015 |
| CN | 105130413 A | 12/2015 |
| CN | 111755193 * | 10/2020 |
| CN | 111755193 A | 10/2020 |
| EP | 1 953 123 A1 | 8/2008 |
| EP | 1 981 044 A2 | 10/2008 |
| EP | 2 819 129 A1 | 12/2014 |
| EP | 2 916 328 A2 | 9/2015 |
| EP | 3 633 697 A1 | 4/2020 |
| JP | 2002-141212 A | 5/2002 |
| JP | 2012-209295 A | 10/2012 |
| JP | 2015-181147 A | 10/2015 |
| JP | 2017-005004 A | 1/2017 |
| JP | 2017-126719 A | 7/2017 |
| JP | 2019-172509 A | 10/2019 |
| KR | 10-1131795 B1 | 3/2012 |
| WO | WO-2011/001831 A1 | 1/2011 |
| WO | WO-2014/050433 A1 | 4/2014 |

(Continued)

OTHER PUBLICATIONS

U.S. Notice of Allowance dated Apr. 13, 2022 issued in U.S. Appl. No. 16/823,871.

*Primary Examiner* — C Melissa Koslow (74) *Attorney, Agent, or Firm* — Faegre Drinker Biddle & Reath LLP (57) ABSTRACT

A ferrite sintered magnet 100 comprises M-type ferrite crystal grains 4 and multiple-crystal grain boundaries 6b surrounded by three or more of the M-type ferrite crystal grains 4. The ferrite sintered magnet 100 contains at least Fe, Ca, B, and Si, and contains 0.005 to 0.9 mass % of B in terms of $B_2O_3$. The multiple-crystal grain boundaries 6b contain Si and Ca, and in a case where the molar ratio of Ca to Si in the multiple-crystal grain boundaries 6b is represented by $(Ca/Si)_G$, the following formula is satisfied.

$$0.1 < (Ca/Si)_G < 0.9$$

16 Claims, 3 Drawing Sheets

(56) References Cited

FOREIGN PATENT DOCUMENTS

WO    WO-2018/117261 A1    6/2018
WO    WO-2018/216594 A1    11/2018

\* cited by examiner

FERRITE SINTERED MAGNET AND ROTARY ELECTRICAL MACHINE COMPRISING THE SAME

TECHNICAL FIELD

The present invention relates to a ferrite sintered magnet and a rotary electrical machine comprising the same.

BACKGROUND

As magnetic materials to be used in ferrite sintered magnets, Ba ferrite, Sr ferrite, and Ca ferrite having a hexagonal structure are known. In recent years, among these, magnetoplumbite-type (M-type) ferrite has attracted attention as a magnet material for rotary electrical machines such as motors. The M-type ferrite is usually represented by the formula of $AFe_{12}O_{19}$.

In recent years, as M-type ferrites, those not containing rare earth elements and Co, such as those containing Na, have been developed from the viewpoint of reducing raw material costs.

CITATION LIST

Patent Literature

[Patent Literature 1] International Publication No. WO 2013/125600
[Patent Literature 2] International Publication No. WO 2013/125601

SUMMARY

Technical Problem

Meanwhile, strength characteristics such as bending strength are important in ferrite sintered magnets. However, conventional ferrite sintered magnets do not necessarily have sufficient strength. In response to the above issue, it is an object of the present invention to provide a ferrite sintered magnet which has excellent magnetic properties and strength, and a rotary electrical machine using the same.

Solution to Problem

A ferrite sintered magnet according to one aspect comprises M-type ferrite crystal grains and multiple-crystal grain boundaries surrounded by three or more of the M-type ferrite crystal grains,
wherein the ferrite sintered magnet contains at least Fe, Ca, B, and Si,
the ferrite sintered magnet contains 0.005 to 0.9 mass % of B in terms of $B_2O_3$,
the multiple-crystal grain boundaries contain Si and Ca, and
in a case where a molar ratio of Ca to Si in the multiple-crystal grain boundaries is represented by $(Ca/Si)_G$, the following formula is satisfied.

$$0.1 < (Ca/Si)_G < 0.9$$

Here, it is possible for the magnet to further satisfy $0.1 < (Ca/Si)_G < 0.5$.
Further, it is possible for the M-type ferrite crystal grains to be Sr ferrite crystal grains, and for the multiple-crystal grain boundaries to contain Sr.

Here, when the ratio of the number of Ca atoms to the total number of Fe, Sr, Ca, and Si atoms in the M-type ferrite crystal grains is Mc1, and
the ratio of the number of Ca atoms to the total number of Fe, Sr, Ca, and Si atoms in the multiple-crystal grain boundaries is Gc1, the following formula can be satisfied.

$$20 < Gc1/Mc1 < 90$$

Furthermore, $20 < Gc1/Mc1 < 70$ can also be satisfied.
Further, when the ratio of the number of Sr atoms to the total number of Fe, Sr, Ca, and Si atoms in the M-type ferrite crystal grains is Mr1, and
the ratio of the number of Sr atoms to the total number of Fe, Sr, Ca, and Si atoms in the multiple-crystal grain boundaries is Gr1, the following formula can be satisfied.

$$2.0 < Gr1/Mr1 < 3.2$$

Further, in the magnet, it is also possible for the Sr ferrite crystal grains to contain Zn, and for the multiple-crystal grain boundaries to contain Zn.
Here, when the ratio of the number of Zn atoms to the total number of Fe, Sr, Ca, Si, and Zn atoms in the M-type ferrite crystal grains is Mz2, and
the ratio of the number of Zn atoms to the total number of Fe, Sr, Ca, Si, and Zn atoms in the multiple-crystal grain boundaries is Gz2, the following formula can be satisfied.

$$0.2 < Gz2/Mz2 < 2.9$$

Further, it is possible for the magnet to satisfy the following formula when the molar ratio of Sr to Zn in the multiple-crystal grain boundaries is $(Sr/Zn)_G$.

$$40 < (Sr/Zn)_G < 700$$

Further, it is possible for the magnet to satisfy the following formula when the molar ratio of Ca to Zn in the multiple-crystal grain boundaries is $(Ca/Zn)_G$.

$$50 < (Ca/Zn)_G < 2000$$

Further, in a case where the molar ratio of Sr to Zn in the M-type ferrite crystal grains is represented by $(Sr/Zn)_M$, the following formula can be satisfied.

$$22 < (Sr/Zn)_M < 70$$

Further, when the molar ratio of Ca to Zn in the M-type ferrite crystal grains is $(Ca/Zn)_M$, the following formula can be satisfied.

$$2.1 < (Ca/Zn)_M < 7.0$$

Further, when the molar ratio of Fe to Zn in the M-type ferrite crystal grains is $(Fe/Zn)_M$, the following formula can be satisfied.

$$460 < (Fe/Zn)_M < 1500$$

Further, in the ferrite sintered magnet, it is possible for the content of Si to be 0.05 to 1.3 mass % in terms of $SiO_2$, for the content of Ca to be 0.15 to 2.0 mass % in terms of CaO, for the content of Zn to be 0.01 to 1.47 mass % in terms of ZnO, for the content of Mn to be 0.25 to 1.5 mass % in terms of MnO, and for the content of Cr to be 0.03 to 0.2 mass % in terms of $Cr_2O_3$.
Further, it is possible for the ferrite sintered magnet substantially not to contain La and Co.
A rotary electrical machine according to another aspect includes any one of the ferrite sintered magnets described above.

DETAILED DESCRIPTION

Hereinafter, suitable embodiments of the present invention will be described in detail with reference to the drawings as necessary.

(Ferrite Sintered Magnet)

Figure 1:
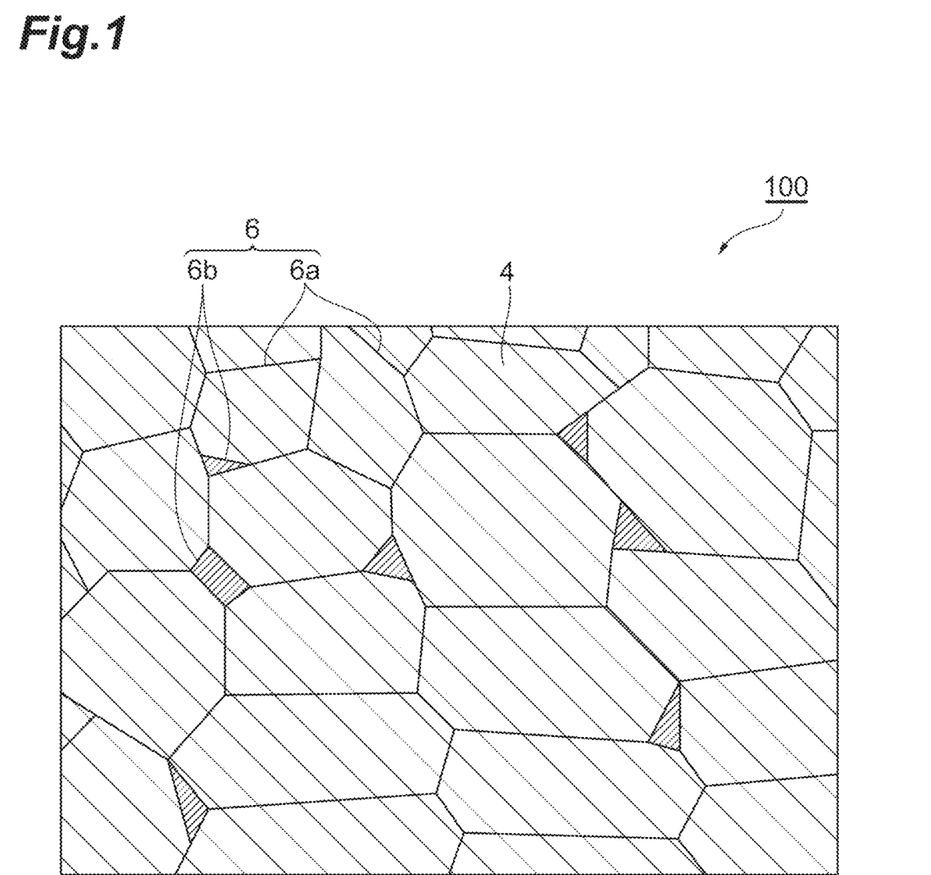
FIG. 1 is a schematic diagram illustrating an example of a cross-sectional structure of a ferrite sintered magnet according to one or more embodiments.

As illustrated in FIG. 1, a ferrite sintered magnet 100 according to the embodiment of the present invention has M-type ferrite crystal grains (main phase) 4 having a hexagonal structure and grain boundaries 6 present between the M-type ferrite crystal grains 4.

The grain boundaries 6 are disposed between the M-type ferrite crystal grains 4. The grain boundaries 6 have two-crystal grain boundaries 6a formed between two of the M-type ferrite crystal grains 4 and multiple-crystal grain boundaries 6b surrounded by three or more of the M-type ferrite crystal grains 4.

(M-Type Ferrite Crystal Grains)

It is possible for the M-type ferrite crystal grains to contain M-type ferrite represented by the formula (1) as a main component.

$$AX_{12}O_{19} \tag{1}$$

Here, A includes at least one selected from the group consisting of Sr, Ba, and Ca.

It is possible for the M-type ferrite to be Sr ferrite in which Sr accounts for 34 at % or more of A, Ba ferrite in which Ba accounts for 34 at % or more of A, and Ca ferrite in which Ca accounts for 34 at % or more of A. In the Sr ferrite, Ba ferrite, and Ca ferrite, it is possible for Sr, Ba, and Ca to be the maximum component in the atomic percentage of A, respectively.

It is possible for the remaining elements of A in the Sr ferrite to be at least one selected from the group consisting of Ba and Ca. It is possible for the remaining elements of A in the Ba ferrite to be at least one selected from the group consisting of Sr and Ca. It is possible for the remaining elements of A in the Ca ferrite to be at least one selected from the group consisting of Sr and Ba.

X necessarily contains Fe. The atomic percentage of Fe may be 50% or more. It is possible for the remainder of X to be one or more elements selected from the group consisting of Zn (zinc), Mn (manganese), Al (aluminum), and Cr (chromium).

It is possible for the M-type Sr ferrite to be represented by the following formula (3), for example.

$$Sr_{1-z}R_z(Fe_{12-x}M_x)_yO_{19} \tag{3}$$

In the above formula (3), x is, for example, 0.01 to 0.5, y is, for example, 0.7 to 1.2, and z is 0 to 0.5, and may be 0 or 0.01 to 0.49, for example. It is possible for R to be Ca and/or Ba.

It is possible that the M-type ferrite be Sr ferrite.

It is possible for the M-type Ba ferrite to be represented by the following formula (4), for example.

$$Ba_{1-z}R_z(Fe_{12-x}M_x)_yO_{19} \tag{4}$$

In the above formula (4), x is, for example, 0.01 to 0.5, y is, for example, 0.7 to 1.2, and z is 0 to 0.5, and may be 0 or 0.01 to 0.49, for example. It is possible for R to be Sr and/or Ca.

It is possible for the M-type Ca ferrite to be represented by the following formula (5), for example.

$$Ca_{1-z}R_z(Fe_{12-x}M_x)_yO_{19} \tag{5}$$

In the above formula (5), x is, for example, 0.01 to 0.5, y is, for example, 0.7 to 1.2, and z is 0 to 0.5, and may be 0 or 0.01 to 0.49, for example. It is possible for R to be Sr and/or Ba.

It is possible for M in the above formulas (3) to (5) to be one or more elements selected from the group consisting of Zn (zinc), Mn (manganese), Al (aluminum), and Cr (chromium).

The ratios of the A sites and the X sites and the ratio of oxygen (O) in the above formulas (3) to (5) show values slightly deviated from the above range in reality, and therefore may be slightly different from the above numerical values.

In a case where the M-type ferrite in the ferrite sintered magnet is represented by the above formulas (3) to (5), M may contain Mn and Cr and may contain Mn, Cr, and Zn.

It is possible that the M-type ferrite crystal grains 4 be Sr ferrite crystal grains, and in this case, the multiple-crystal grain boundaries 6b usually contain Sr. Further, it is possible that the Sr ferrite crystal grains further contain Zn, and in this case, the multiple-crystal grain boundaries 6b usually contain Zn.

When the molar ratio of Sr to Zn in the M-type ferrite crystal grains 4 is $(Sr/Zn)_M$, it is possible that $(Sr/Zn)_M$ satisfy the following formula.

$$22<(Sr/Zn)_M<70$$

According to this, the size and the shape of the M-type ferrite crystal grains 4, as well as the composition thereof, are optimized.

$(Sr/Zn)_M$ is, for example, calculated as Mr2/Mz2, when the ratio of the number of Sr atoms to the total number of Fe, Sr, Ca, Si, and Zn atoms in the M-type ferrite crystal grains 4 is Mr2, and the ratio of the number of Zn atoms to the total number of Fe, Sr, Ca, Si, and Zn atoms in the M-type ferrite crystal grains 4 is Mz2.

In a case where the molar ratio of Ca to Zn in the M-type ferrite crystal grains 4 is $(Ca/Zn)_M$, it is possible that $(Ca/Zn)_M$ satisfy the following formula.

$$2.1<(Ca/Zn)_M<7.0$$

According to this, the size and the shape of the M-type ferrite crystal grains 4, as well as the composition thereof, are optimized.

$(Ca/Zn)_M$ is, for example, calculated as Mc2/Mz1, when the ratio of the number of Ca atoms to the total number of Fe, Sr, Ca, Si, and Zn atoms in the M-type ferrite crystal grains 4 is Mc2, and the ratio of the number of Zn atoms to the total number of Fe, Sr, Ca, Si, and Zn atoms in the M-type ferrite crystal grains 4 is Mz2.

In a case where the molar ratio of Fe to Zn in the M-type ferrite crystal grains 4 is $(Fe/Zn)_M$, it is possible that $(Fe/Zn)_M$ satisfy the following formula.

$$460<(Fe/Zn)_M<1500$$

According to this, the size and the shape of the M-type ferrite crystal grains 4, as well as the composition thereof, are optimized.

$(Fe/Zn)_M$ is, for example, calculated as Mf2/Mz2, when the ratio of the number of Fe atoms to the total number of Fe, Sr, Ca, Si, and Zn atoms in the M-type ferrite crystal grains 4 is Mf2, and the ratio of the number of Zn atoms to the total number of Fe, Sr, Ca, Si, and Zn atoms in the M-type ferrite crystal grains 4 is Mz2.

The mass fraction of the M-type ferrite in the M-type ferrite crystal grains may be 90% or more, 95% or more, or 97% or more.

The mass ratio of the M-type ferrite crystal grains (main phase) to the entire crystal grains in the ferrite sintered magnet may be 90% or more, 95% or more, or 97% or more. As such, it is possible to further increase the magnetic properties by reducing the mass ratio of a crystal phase different from the M-type ferrite phase (heterophase). It is possible to confirm the mass ratio (%) of the M-type ferrite phase in the entire crystal grains of the ferrite sintered magnet by determining the abundance rate (mol %) of the M-type ferrite phase by X-ray diffraction. The abundance rate of the M-type ferrite phase of a sample is calculated by mixing powder samples of M-type ferrite, orthoferrite, hematite, spinel, and W-type ferrite at a predetermined ratio to obtain a reference, and comparing X-ray diffraction intensities of the sample and the reference.

(Grain Boundaries)

The main component of the grain boundaries 6 is an oxide. In the grain boundaries 6, the constituent elements other than oxygen of the oxide always contain Si (silicon) and Ca (calcium), and can contain B (boron). Further, it is possible for the constituent elements to contain at least one or a combination of any two or more selected from Sr (strontium), Ba (barium), Fe (iron), Mn (manganese), Zn (zinc), Cr (chromium), and Al (aluminum). Examples of the oxides include $SiO_2$, CaO, BaO, SrO, $Al_2O_3$, ZnO, $Fe_2O_3$, MnO, $Cr_2O_3$, and $B_2O_3$. Silicate glass may also be contained. It is possible for the oxide to occupy 90 mass % or more, 95 mass % or more, or 97 mass % or more of the grain boundaries 6.

The constituent elements of the multiple-crystal grain boundaries 6b are the same as those in the grain boundaries 6, contain Si and Ca, may contain B, and may further contain the above elements.

In a case where the molar ratio of Ca to Si in the multiple-crystal grain boundaries 6b is $(Ca/Si)_G$, the ferrite sintered magnet satisfies the following formula.

$$0.1 < (Ca/Si)_G < 0.9$$

$(Ca/Si)_G$ is, for example, calculated as Gc1/Gs1, when the ratio of the number of Ca atoms to the total number of Fe, Sr, Ca, and Si atoms in the multiple-crystal grain boundaries 6b is Gc1, and the ratio of the number of Si atoms to the total number of Fe, Sr, Ca, and Si atoms in the multiple-crystal grain boundaries 6b is Gs1.

In the multiple-crystal grain boundaries 6b, it is possible that $0.1 < (Ca/Si)_G < 0.5$ be further satisfied.

It is considered that in a case where the ratio of Si to Ca in the multiple-crystal grain boundaries 6b is high as described above, the size and the shape of the M-type ferrite crystal grains 4, as well as the composition thereof, are optimized, so that the magnetic interaction between the M-type ferrite crystal grains 4 is suppressed, and thus the improvement of HcJ and the improvement of mechanical strength can be made.

It is also conceivable that Ca is easily dissolved in the M-type ferrite crystal grains 4, so that the magnetocrystalline anisotropy is improved and the coercive force is increased.

In a case where the molar ratio of Sr to Zn in the multiple-crystal grain boundaries 6b is $(Sr/Zn)_G$, it is possible that $(Sr/Zn)_G$ satisfy the following formula.

$$40 < (Sr/Zn)_G < 700$$

As a result, the size and the shape of the M-type ferrite crystal grains 4, as well as the composition thereof, are optimized.

$(Sr/Zn)_G$ is, for example, calculated as Gr2/Gz2, when the ratio of the number of Sr atoms to the total number of Fe, Sr, Ca, Si, and Zn atoms in the multiple-crystal grain boundaries 6b is Gr2, and the ratio of the number of Zn atoms to the total number of Fe, Sr, Ca, Si, and Zn atoms in the multiple-crystal grain boundaries 6b is Gz2.

In a case where the molar ratio of Ca to Zn in the multiple-crystal grain boundaries 6b is $(Ca/Zn)_G$, it is possible that $(Ca/Zn)_G$ satisfy the following formula.

$$50 < (Ca/Zn)_G < 2000$$

According to this, the size and the shape of the M-type ferrite crystal grains 4, as well as the composition thereof, are optimized.

An example of $(Ca/Zn)_G$ is Gc2/Gz2 when the ratio of the number of Ca atoms to the total number of Fe, Sr, Ca, Si, and Zn atoms in the multiple-crystal grain boundaries 6b is Gc2, and the ratio of the number of Zn atoms to the total number of Fe, Sr, Ca, Si, and Zn atoms in the multiple-crystal grain boundaries 6b is Gz2.

(Element Ratio Between M-Type Ferrite Crystal Grains and Multiple-Crystal Grain Boundaries)

When the ratio of the number of Ca atoms to the total number of Fe, Sr, Ca, and Si atoms in the M-type ferrite crystal grains 4 is Mc1, and the ratio of the number of Ca atoms to the total number of Fe, Sr, Ca, and Si atoms in the multiple-crystal grain boundaries 6b is Gc1, it is possible that the following formula be satisfied.

$$20 < Gc1/Mc1 < 90$$

Here, it is possible that $20 < Gc1/Mc1 < 70$ be satisfied.

As a result, the interaction between the M-type ferrite crystal grains 4 and the multiple-crystal grain boundaries 6b is optimized, and high magnetic properties and mechanical strength are obtained.

Further, when the ratio of the number of Sr atoms to the total number of Fe, Sr, Ca, and Si atoms in the M-type ferrite crystal grains 4 is Mr1, and the ratio of the number of Sr atoms to the total number of Fe, Sr, Ca, and Si atoms in the multiple-crystal grain boundaries 6b is Gr1, it is possible that the following formula be satisfied.

$$2.0 < Gr1/Mr1 < 3.2$$

According to this, it is considered that since the ratio of Sr in the multiple-crystal grain boundaries 6b is lower than that in the M-type ferrite crystal grains 4, the size and the shape of the M-type ferrite crystal grains 4, as well as the composition thereof, are optimized, so that the magnetic interaction between the M-type ferrite crystal grains 4 is suppressed, and thus the improvement of HcJ and the improvement of mechanical strength can be made.

When the ratio of the number of Zn atoms to the total number of Fe, Sr, Ca, Zn, and Si atoms in the M-type ferrite crystal grains 4 is Mz2, and the ratio of the number of Zn atoms to the total number of Fe, Sr, Ca, Zn, and Si atoms in the multiple-crystal grain boundaries 6b is Gz2, it is possible that the following formula be satisfied.

$$0.2<Gz2/Mz2<2.9$$

As a result, the interaction between the M-type ferrite crystal grains 4 and the multiple-crystal grain boundaries 6b is optimized, and high magnetic properties and mechanical strength are obtained.

(Overall Composition)

The ferrite sintered magnet according to the embodiment of the present invention is an oxide containing at least Fe, Ca, B, and Si.

The content of Fe in the ferrite sintered magnet may be 80 to 95 mass %, or 87 to 90 mass % in terms of $Fe_2O_3$. By setting the content within the above range, good magnetic properties can be obtained.

In one or more embodiments, the ferrite sintered magnet contain Sr, and in a case where the M-type ferrite crystal grains in the ferrite sintered magnet are Sr ferrite crystal grains, the content of Sr in the ferrite sintered magnet may be 9 to 11 mass %, or 9 to 10 mass % in terms of SrO.

In a case where the M-type ferrite crystal grains in the ferrite sintered magnet are Ba ferrite crystal grains, the content of Ba in the ferrite sintered magnet may be 13 to 17 mass %, or 13 to 15 mass % in terms of $Ba_2O_3$.

In a case where the M-type ferrite crystal grains in the ferrite sintered magnet are Ca ferrite crystal grains, the content of Ca in the ferrite sintered magnet may be 2 to 5 mass %, or 2 to 4 mass % in terms of CaO.

The ferrite sintered magnet contains Ca (calcium) regardless of whether the M-type ferrite crystal grains which are the main phase are Sr ferrite crystal grains or Ba ferrite crystal grains. In a case where the main phase is Sr ferrite crystal grains or Ba ferrite crystal grains, the content of Ca in the ferrite sintered magnet may be 0.15 to 2.0 mass %, 0.4 to 1.0 mass %, or 0.47 to 0.62 mass % in terms of CaO. When Ca is too much, HcJ tends to decrease, or it is too little, Br tends to decrease; therefore, by setting the content of Ca within the above range, optimum grain boundaries are formed and thus high magnetic properties are easily obtained.

The ferrite sintered magnet contains B. The content of B in the ferrite sintered magnet is 0.005 to 0.9 mass % in terms of $B_2O_3$. From the viewpoint of further increasing the coercive force and squareness ratio (Hk/HcJ) of the ferrite sintered magnet, the content of B may be 0.01 mass % or more in terms of $B_2O_3$. In addition, from the viewpoint of further increasing the residual magnetic flux density (Br) of the ferrite sintered magnet, the content of B may be 0.4 mass % or less, or 0.2 mass % or less in terms of $B_2O_3$.

It is considered that since the ratio of Si in the multiple-crystal grain boundaries 6b is increased by the addition of B, the size and the shape of the M-type ferrite crystal grains 4, as well as the composition thereof, are optimized, so that the magnetic interaction between the M-type ferrite crystal grains 4 is suppressed, and thus the improvement of HcJ and the improvement of mechanical strength can be made.

The ferrite sintered magnet contains Si (silicon). The content of Si in the ferrite sintered magnet may be 0.05 to 1.3 mass %, 0.2 to 0.5 mass %, or 0.25 to 0.36 mass % in terms of $SiO_2$. When $SiO_2$ is too much, Br tends to decrease, and when it is too little, HcJ tends to decrease; therefore, by setting the $SiO_2$ content within the above range, optimum grain boundaries are formed and thus high magnetic properties are easily obtained.

Further, in a case where the M-type ferrite crystal grains which are the main phase are Sr ferrite crystal grains, it is possible for the ferrite sintered magnet to contain Ba. The content of Ba may be 0 to 0.2 mass % in terms of BaO.

In a case where the M-type ferrite crystal grains which are the main phase are Ca ferrite crystal grains, it is possible for the ferrite sintered magnet to contain at least one selected from the group consisting of Sr and Ba and the content of Ba may be 0 to 1.5 mass % in terms of BaO. The content of Sr may be 0 to 1.0 mass % in terms of SrO.

In a case where the M-type ferrite crystal grains which are the main phase are Ba ferrite crystal grains, it is possible for the ferrite sintered magnet to contain Sr. The content of Sr may be 0 to 0.8 mass % in terms of SrO.

It is possible for the ferrite sintered magnet to contain Mn. The content of Mn in the ferrite sintered magnet may be 0.25 to 1.5 mass % in terms of MnO. By replace the Fe sites with Mn satisfying the above range, the effect of improving the magnetic properties can be easily obtained, and the function of promoting the solid solution of Zn is presumed.

It is possible for the ferrite sintered magnet to contain Cr. The content of Cr in the ferrite sintered magnet may be 0.03 to 0.2 mass % in terms of $Cr_2O_3$. By replace the Fe sites with Cr satisfying the above range, the effect of improving the magnetic properties can be easily obtained, and the function of promoting the solid solution of Zn is presumed.

It is possible for the ferrite sintered magnet to contain Zn. The content of Zn in the ferrite sintered magnet is 0.01 to 1.47 mass % in terms of ZnO. From the viewpoint of further increasing the residual magnetic flux density (Br) of the ferrite sintered magnet, the content of Zn may be 0.08 mass % or more, and 0.15 mass % or more in terms of ZnO. In addition, from the viewpoint of further increasing the coercive force and squareness ratio (Hk/HcJ) of the ferrite sintered magnet, the content of Zn may be 1.0 mass % or less, and 0.5 mass % or less in terms of ZnO.

According to this, it is considered that when Zn is dissolved in the ferrite crystal grains, the saturation magnetization is improved, and when Zn is present in the multiple-crystal grain boundaries, the size and the shape of the M-type ferrite crystal grains 4, as well as the composition thereof, are optimized, so that the magnetic interaction between the M-type ferrite crystal grains 4 is suppressed, and thus the improvement of HcJ and the improvement of mechanical strength can be made.

It is considered that saturation magnetization Br improves by selectively substituting Zn for Fe sites having a magnetic moment aligned in the antiparallel direction. On the other hand, the coercive force is lowered because the crystal magnetic anisotropy is lowered due to the substitution of Zn, but it is presumed that the magnetic interaction between crystal grains is suppressed by the homogeneous formation of the grain boundaries containing B, and the reduction of the coercive force can be suppressed, and the coercive force can be maintained.

It is possible that the ferrite sintered magnet do substantially not contain rare earth elements and Co (cobalt). The rare earth elements are Sc, Y, La, Ce, Pr, Nd, Pm, Sm, Eu, Gd, Tb, Dy, Ho, Er, Tm, Yb, and Lu.

The ferrite sintered magnet may contain Ni, but it is possible that the ferrite sintered magnet do substantially not contain Ni. It is possible to set the concentration of Ni to be 0.02 mass % or less.

The ferrite sintered magnet may contain Cu, but it is possible that the ferrite sintered magnet do substantially not contain Cu. It is possible to set the concentration of Cu to be 0.02 mass % or less.

By not containing these metals, the cost reduction becomes possible.

Here, "the ferrite sintered magnet does not substantially contain the element A" means that the concentration of the element A in the ferrite sintered magnet is less than 0.005 mass % in terms of oxide. It is possible that the concentration of the element A be less than 0.001 mass % in terms of oxide.

The ferrite sintered magnet does not need to contain Al, but may contain Al. It is possible to set the content of Al to be 0 to 0.2 mass % in terms of $Al_2O_3$.

The ferrite sintered magnet does not need to contain Na, and it is possible substantially not to contain Na. The content of Na may be 0.005 mass % or less in terms of $Na_2O$. It is possible that it be 0.001 mass % or less. The smaller the Na content, the better the moldability.

In the ferrite sintered magnet, in addition to these components, impurities contained in the raw materials or unavoidable components derived from production facilities may be contained. Examples of such components include oxides of Mg (magnesium), Ti (titanium), Mo (molybdenum), V (vanadium), and the like. It is possible that the content of these be 0.06 mass % or less in total.

It is possible to measure the content of each component of the ferrite sintered magnet using fluorescent X-ray analysis and inductively coupled plasma emission spectroscopic analysis (ICP analysis).

(Texture Structure)

In the cross-section parallel to the c-axis of the ferrite sintered magnet, it is possible that the arithmetic means of the maximum diameters of the M-type ferrite crystal grains 4 and the multiple-crystal grain boundaries 6b be 0.5 to 2.0 μm and 0.2 to 1.0 μm, respectively. The maximum diameter is the diameter of the M-type ferrite crystal grain 4 or the multiple-crystal grain boundary 6b measured in the direction in which the diameter thereof becomes maximum. In addition, the c-axis in the ferrite sintered magnet is an easy magnetization axis in the ferrite sintered magnet.

(Property)

The residual magnetic flux density (Br) of the ferrite sintered magnet may be 420 mT or more, 440 mT or more, or 450 mT or more. The coercive force of the ferrite sintered magnet may be 260 kA/m or more, 270 kA/m or more, or 280 kA/m or more. The squareness ratio (Hk/HcJ) of the ferrite sintered magnet may be 85% or more, 88% or more, or 90% or more. In particular, the ferrite sintered magnet may have a residual magnetic flux density (Br) of 440 mT or more and a squareness ratio (Hk/HcJ) of 85% or more. By having such excellent magnetic properties, it is possible to use more suitably for motors and generators.

Moreover, it is possible for the ferrite sintered magnet to have sufficient mechanical strength. Ferrite sintered magnets with high mechanical strength are easy to handle and can effectively prevent cracking and chipping during conveyance and thus product yield is improved, thereby contributing to cost reduction. Furthermore, since the ferrite sintered magnet having high mechanical strength is not easily broken after being incorporated in a product such as a motor, the reliability of the product can be improved.

There is no particular limitation on the shape of the ferrite sintered magnet, and various shapes such as an arc segment (C-type) shape that is curved such that the end face thereof has an arc shape, a flat plate shape, and the like can be taken.

It is possible to use the ferrite sintered magnet as rotary electrical machines such as motors and generators; magnets for speaker/headphone; magnetron tubes; magnetic field generators for MRI; dampers for CD-ROM; sensors for distributor; sensors for ABS; fuel/oil level sensor; magnet latches; or magnetic field generating members such as isolator. Moreover, it is also possible to use as a target (pellet) when the magnetic layer of the magnetic recording medium is formed by vapor deposition or sputtering.

(Rotary Electrical Machine)

Figure 2:
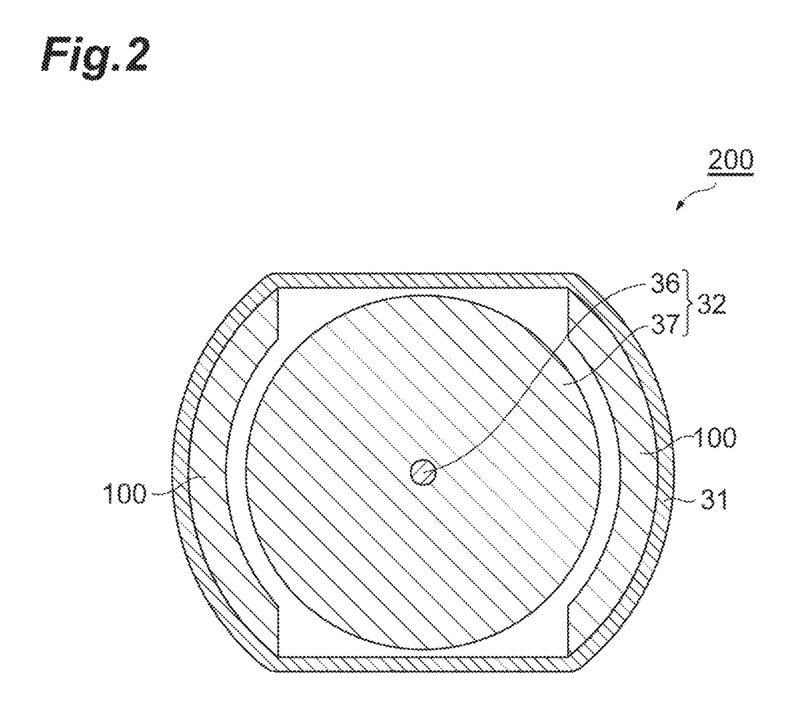
FIG. 2 is a schematic cross-sectional view of a motor having the ferrite sintered magnet according to one or more embodiments.

FIG. 2 shows a motor according to an embodiment of the present invention. The motor 200 includes a stator 31 and a rotor 32. The rotor 32 has a shaft 36 and a rotor core 37. In the motor 200 of the present embodiment, a C-shaped ferrite sintered magnet 100 that is a permanent magnet in the stator 31, and an electromagnet (coil) is provided in the rotor core 37 of the rotor 32.

Since the ferrite sintered magnet 100 has a high Br content, the thickness can be reduced, so that the gap between the stator 31 and the rotor 32 can be sufficiently reduced. Hence, the motor 200 can be miniaturized while maintaining the performance.

Alternatively, the motor may be a motor in which the ferrite sintered magnet is provided in the rotor and the electromagnet (coil) is provided in the stator may be used. There is no particular limitation on the form of the motor. Another example of the rotary electrical machine is a generator having a rotor and a stator. It is possible for the ferrite sintered magnet to be provided on the rotor or stator in this case as well.

(Production Method)

Next, an example of a method of producing the ferrite sintered magnet will be described. The method of producing the ferrite sintered magnet includes a blending step, a calcination step, a pulverization step, a molding step in a magnetic field, and a firing step. The details of the respective steps will be described below.

The blending step is a step of preparing a mixed powder for calcination. It is possible for the mixed powder for calcination to be a powder containing all the metal elements constituting the M-type ferrite. In the blending step, it is possible to mix a plurality of types of powders such as a powder containing Fe and a powder containing Sr with an attritor or a ball mill for about 1 to 20 hours and performing a pulverization treatment to obtain a mixed powder.

In the blending step, a powder containing other metal elements contained in the ferrite sintered magnet other than the metal elements constituting the ferrite, and a powder containing a metalloid element may be mixed. Examples of other powders include a powder containing Si, a powder containing Ca, a powder containing Zn, and a powder containing B.

Examples of the powder containing each element include a simple substance of each element, oxides, hydroxides, carbonates, nitrates, silicates, and organometallic compounds of each element. One powder may contain two or more metal elements, or one powder may contain substantially only one metal element. One powder may contain a metal element and a metalloid element.

An example of the powder containing Fe is $Fe_2O_3$.

Examples of the powder containing Sr are $SrCO_3$ and SrO.

An example of the powder containing Si is $SiO_2$.

Examples of the powder containing Ca are $CaCO_3$ and CaO.

An example of the powder containing Zn is ZnO.

An example of a powder containing Ba is BaO.

An example of the powder containing B is $H_3BO_3$.

Since B tends to dissolve in water and evaporate by heat, it is possible to add B in a larger amount as appropriate.

In particular, as a compound containing B, $H_3BO_3$ is possible rather than $B_2O_3$, and it is desirable to add the whole amount in the blending step. $H_3BO_3$ has a higher solubility in water than $B_2O_3$ and thus can be homogeneously dispersed at the molecular level (boric acid 5.7 g/100 ml, boron oxide 3.6 g/100 ml at 25° C.), and since the specific gravity of boric acid is lower (1.5 g/cm$^3$ for boric acid and 1.9 g/cm$^3$ or more for boron oxide), dispersion during stirring and mixing is easier. Furthermore, even in a case where an undissolved portion remains, boric acid decomposes at a relatively low temperature, so that homogeneous dispersion can be expected. (Decomposition temperature: 171° C. for boric acid, 450° C. for boron oxide). Furthermore, by adding the whole amount in the blending step, it is possible to obtain the maximum effect that boron forms a homogeneous structure with other components during calcination.

That is, by adding the whole amount of $H_3BO_3$ in the blending step, for example, it is possible to reduce the number N of large multiple-crystal grain boundaries 6b, it is possible to increase the number P of small multiple-crystal grain boundaries 6b, thus formation of two-crystal grain boundaries 6a that has a large average thickness d becomes possible, and thus it is possible to increase the number Q of ferrite crystal grains of 1 μm or less. Therefore, it is considered that it is possible to obtain high magnetic properties and strength.

The average particle diameter of the raw material powder is not particularly limited and is, for example, 0.1 to 2.0 μm.

Also, it is possible for minor additive elements such as Cr, Mn, Al, and Ba that may be contained in the final ferrite sintered magnet product to be included in the powder in advance. In a case where the contents of the minor additive elements in the above powders are little, as necessary, a mixed powder for calcination may be obtained by further adding a powder containing Cr ($Cr_2O_3$), a powder containing Mn (MnO), a powder containing Al ($Al_2O_3$), a powder containing Ba (BaO) or the like in the blending step.

The composition of the metal and metalloid elements in the mixed powder roughly matches the composition of the final ferrite sintered magnet product, but does not match exactly because elements that disappear during the producing steps exist.

The calcination step is a step of calcining the mixed powder obtained in the blending step. It is possible to perform the calcination in an oxidizing atmosphere such as air. The calcining temperature may be 850 to 1450° C., 900 to 1350° C., or 1000 to 1300° C., and the calcining time at the calcining temperature may be 1 second to 10 hours, or 1 minute to 3 hours. The content of M-type ferrite in the calcined product obtained by calcining may be 70 mass % or more, or 90 mass % or more. The primary particle size of the calcined product may be 10 μm or less, or 3.0 μm or less.

The pulverization step is a step of pulverizing the calcined product to obtain an M-type ferrite magnet powder. The pulverization step may be performed in one stage, or may be performed in two stages, a coarse pulverization step and a fine pulverization step. Since the calcined product is usually granular or massive, it is possible to first perform a coarse pulverization step. In the coarse pulverization step, by performing dry pulverization using a vibrating rod mill or the like, a pulverized powder having an average particle size of 0.5 to 5.0 μm is prepared. The pulverized powder thus prepared is wet pulverized using a wet attritor, ball mill, jet mill or the like to obtain a fine powder having an average particle size of 0.08 to 5.0 μm, 0.1 to 2.5 μm, or 0.2 to 2 μm.

The specific surface area of the fine powder by the BET method may be 5 to 14 m$^2$/g, or 7 to 12 m$^2$/g. The pulverization time is 30 minutes to 20 hours in a case where a wet attritor is used and 5 to 50 hours in a case where a ball mill is used. It is possible to appropriately adjust these times according to the pulverization method.

In the pulverization step, a powder containing a metal elements and/or a metalloid element (Si, Ca, Ba, Sr, Zn, B, etc.) and/or a powder containing a minor additive element such as Cr, Mn, Al, Ba may be added with respect to the M-type ferrite magnet powder.

In order to increase the degree of magnetic orientation of the ferrite sintered magnet, it is possible to add, in addition to the above components, polyhydric alcohol in the fine pulverization step. The amount of the polyhydric alcohol added is 0.05 to 5.0 mass %, 0.1 to 3.0 mass %, or 0.1 to 2.0 mass % with respect to the subject of addition. The added polyhydric alcohol is thermally decomposed and removed in the firing step after the molding step in a magnetic field.

The molding step in a magnetic field is a step of producing a molded body by molding in a magnetic field the fine powder obtained in the pulverization step. It is possible to perform the molding step in a magnetic field by either dry molding or wet molding. From the viewpoint of increasing the degree of magnetic orientation, wet molding is possible. In a case where the wet molding is performed, the fine pulverization step may be performed in a wet manner, and the obtained slurry may be adjusted to a predetermined concentration to form a wet molding slurry. It is possible to concentrate the slurry by centrifugation or a filter press.

The content of fine powder in the slurry for wet molding may be 30 to 85 mass %. It is possible to use water or a non-aqueous solvent as the dispersion medium of the slurry. In addition to water, a surfactant such as gluconic acid, gluconates, or sorbitol may be added to the slurry for wet molding. Molding in a magnetic field is performed using such a slurry for wet molding. The molding pressure is, for example, 0.1 to 0.5 ton/cm$^2$, and the magnetic field to be applied is, for example, 5 to 15 kOe.

A firing step is a step of firing a molded body to obtain a sintered body. The firing step is usually performed in an oxidizing atmosphere such as the air. The firing temperature may be 1050° C. to 1300° C. or 1150° C. to 1250° C. The firing time at the firing temperature may be 0.5 to 3 hours. It is possible to produce a sintered body, that is, a ferrite sintered magnet through the above steps. The method of producing a ferrite sintered magnet of the present invention is not limited to the above-mentioned method.

According to the above embodiments, it is possible to obtain a ferrite sintered magnet that does substantially not contain both of a rare earth element and Co, and has excellent magnetic properties and strength.

EXAMPLES

Hereinafter, the contents of the present invention will be described in more detail with reference to Examples and Comparative Examples, but the present invention is not limited to these Examples.

(Production of Ferrite Sintered Magnet)

First, the following starting materials were prepared.
$Fe_2O_3$ powder (primary particle size: 0.3 μm)
$SrCO_3$ powder (primary particle size: 2 μm)
$SiO_2$ powder (primary particle size: 0.01 μm)
$CaCO_3$ powder
ZnO powder
$H_3BO_3$ powder Example 1

1000 g of $Fe_2O_3$ powder, 161 g of $SrCO_3$ powder, 12.1 g of $CaCO_3$ powder, 4.33 g of $SiO_2$ powder, 3.5 g of ZnO powder and 0.34 g of $H_3BO_3$ powder were mixed while being pulverized using a wet attritor, and dried and sized. The powder thus obtained was fired at 1250° C. for 1 hour in the air to obtain a granular calcined product. The calcined product was coarsely pulverized using a dry vibrating rod mill to prepare a powder having a specific surface area of 1 $m^2/g$ by the BET method.

A predetermined amount of sorbitol was added to 200 g of the coarsely pulverized powder, and wet pulverization was performed for 24 hours using a ball mill to obtain a slurry. The amount of sorbitol added was 0.25 mass % based on the mass of the coarsely pulverized powder. The specific surface area of the fine powder after pulverization was 8 to 10 $m^2/g$.

Thereafter, the solid content concentration of the slurry was adjusted, and molding was performed using a wet magnetic field molding machine in an applied magnetic field of 12 kOe to obtain a molded body. Three such molded bodies were produced. These molded bodies were fired in the air at 1180, 1195, and 1210° C., respectively, to obtain circular cylindrical ferrite sintered magnets (Example 1).

Examples 2 to 6, Comparative Example 1

Magnets of Examples 2 to 6 and Comparative Example 1 were obtained in the same manner as Example 1 except that the amount of $H_3BO_3$ powder added was changed.

Examples 7 and 8

Magnets of Examples 7 and 8 were obtained in the same manner as Example 4 except that the amount of Mn added was changed by selecting raw material sources having different Mn contents.

Examples 9 and 10

Magnets of Examples 9 and 10 were obtained in the same manner as Example 4 except that the amount of Cr added was changed by selecting raw material sources having different Cr contents.

Examples 11 and 12

Magnets of Examples 11 and 12 were obtained in the same manner as Example 4 except that the amount of ZnO added was changed.

Examples 13 and 14

Magnets of Examples 13 and 14 were obtained in the same manner as Example 4 except that the amount of $SiO_2$ added was changed.

Examples 15 and 16

Magnets of Examples 15 and 16 were obtained in the same manner as Example 4 except that the amount of $CaCO_3$ added was changed.

[Evaluation of Ferrite Sintered Magnet]
<Composition Analysis of Entire Ferrite Sintered Magnet>

The compositions of the produced ferrite sintered magnets of each Example and each Comparative Example were measured by inductively coupled plasma emission spectroscopic analysis (ICP analysis). In the ferrite sintered magnet, in addition to elements such as Fe, Sr, Si, Ca, Zn, and B, elements derived from impurities (Ba, Al, Mn, Cr, etc.) contained in the starting material were detected.

The contents of Fe, Sr, Ba, Al, Si, Ca, Mn, Zn, Cr, Na, and B detected are shown in Table 1 in terms of $Fe_2O_3$, SrO, BaO, $Al_2O_3$, $SiO_2$, CaO, MnO, ZnO, $Cr_2O_3$, $Na_2O$, and $B_2O_3$, respectively. These contents are values (mass %) based on the entire ferrite sintered magnet.

<Composition Analysis of Sr Ferrite Crystal Grains and Multiple-Crystal Grain Boundaries>

After obtaining a cross-section parallel to the easy magnetization axis (c-axis), the atomic concentration ratios of Fe, Sr, Ca, Si, and Zn at the Sr ferrite crystal grains (main phase) and the multiple-crystal grain boundaries were measured, respectively, by TEM-EDX at a magnification of about 40000 times.

For one Example or Comparative Example, the number of Sr ferrite crystal grains measured was 10, the number of multiple-crystal grain boundaries measured was 5, and the arithmetic mean was taken for each.

The atomic concentrations in a case where the total number of Fe, Sr, Ca, and Si atoms are set to 100% and the atomic concentrations in a case where the total number of Fe, Sr, Ca, Si, and Zn atoms are set to 100% are shown in Table 2 and Table 3, respectively.

Mf1, Mr1, Mc1, and Ms1 respectively represent the atomic ratios (at %) of Fe, Sr, Ca, and Si to the total number of Fe, Sr, Ca, and Si atoms in the ferrite crystal grains, and Gf1, Gr1, Gc1, and Gs1 respectively represent the atomic ratios (at %) of Fe, Sr, Ca, and Si to the total number of Fe, Sr, Ca, and Si atoms in the multiple-crystal grain boundaries.

Further, Mf2, Mr2, Mc2, Ms2, and Mz2 respectively represent the atomic ratios (at %) of Fe, Sr, Ca, Si, and Zn to the total number of Fe, Sr, Ca, Si, and Zn atoms in the ferrite crystal grains, and Gf2, Gr2, Gc2, Gs2, and Gz2 respectively represent the atomic ratios (at %) of Fe, Sr, Ca, Si, and Zn to the total number of Fe, Sr, Ca, Si, and Zn atoms in the multiple-crystal grain boundaries.

<Evaluation on Magnetic Properties>

The upper and lower surfaces of the prepared cylindrical ferrite sintered magnet were machined, and then the magnetic properties of the ferrite sintered magnet were measured at a maximum magnetic field applied of 25 kOe using a BH tracer. In the measurement, the residual magnetic flux density (Br) and the coercive force (HcJ) are determined, and the external magnetic field strength (Hk) at which the residual magnetic flux density (Br) becomes 90% was measured, and the squareness ratio (Hk/HcJ) (%) was determined based on this. Among the ferrite sintered magnets produced at firing temperatures of 1180° C., 1195° C., and 1210° C. in Examples and Comparative Examples, the magnetic properties of ferrite sintered magnets produced at 1195° C. where the balance between residual magnetic flux density (Br) and squareness ratio (Hk/HcJ) is the best are shown in Table 4.

<Evaluation of Mechanical Strength>

Figure 3A:
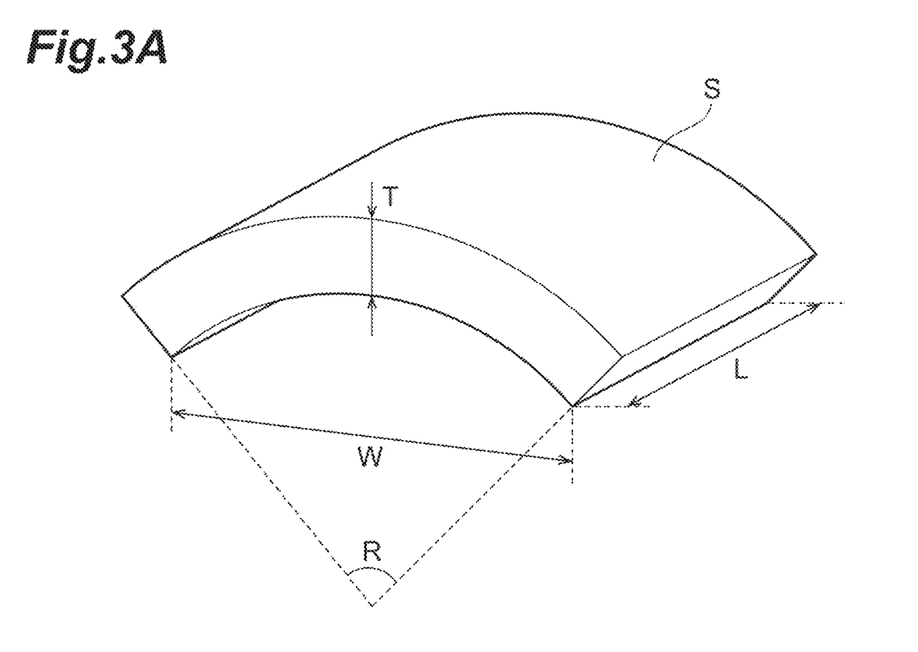
FIG. 3A is a perspective view of a ferrite sintered magnet S having been subjected to a bending strength test.

Under the following conditions, the bending strength ($\sigma$) of the ferrite sintered magnet was measured by a three-point bending test. First, apart from the cylindrical ferrite sintered magnet described above, an arc-shaped ferrite sintered magnet S as shown in FIG. 3A (length L is 34 mm, width W is 25.5 mm, thickness T is 3.7 mm, when assuming a circle including an arc, the angle R between lines in contact from the center of the circle to both ends of the arc is 130 degrees) was prepared. The firing temperature was 1195° C.

Figure 3B:
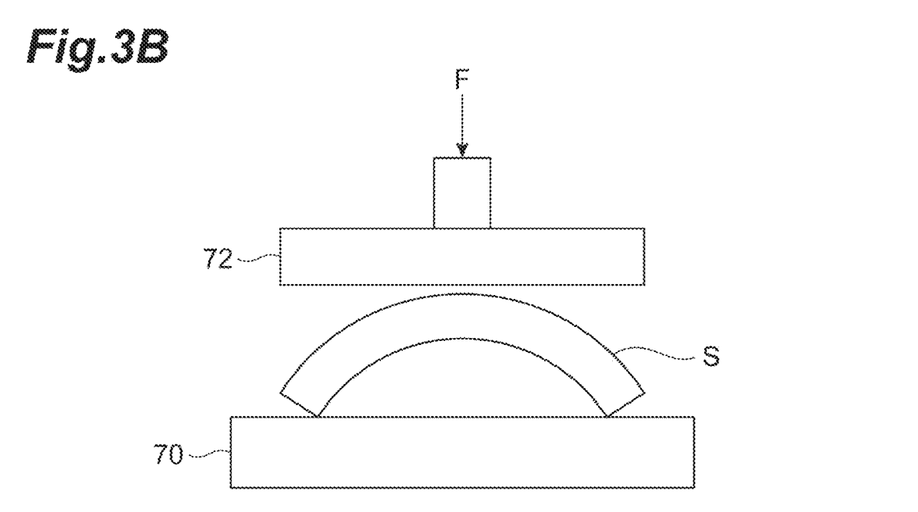
FIG. 3B is a schematic diagram of the bending strength test.

Next, as shown in FIG. 3B, an arc-shaped ferrite sintered magnet S was placed on a horizontal base plate 70, and a load F was applied in the direction of the arrow from the upper side to the lower side by a jig 72 (speed 3 mm/min), the fracture maximum load F [N] when the ferrite sintered magnet S was broken was measured to determine the bending strength (σ) from the following formula. The bending strength (σ) is an average value of 30 samples. The results are presented in Table 5.

$$\sigma[N/mm^2] = 3 \times L \times F / (2 \times W \times T^2)$$

TABLE 1

| | Ferrite sintered magnet composition in terms of oxides | | | | | | | | | | |
|---|---|---|---|---|---|---|---|---|---|---|---|
| | $Fe_2O_3$ mass % | SrO mass % | BaO mass % | $Al_2O_3$ mass % | $SiO_2$ mass % | CaO mass % | MnO mass % | ZnO mass % | $Cr_2O_3$ mass % | $Na_2O$ mass % | $B_2O_3$ mass % | Total |
|---|---|---|---|---|---|---|---|---|---|---|---|
| Comp. Ex. 1 | 88.966 | 9.327 | 0.078 | 0.063 | 0.295 | 0.557 | 0.350 | 0.272 | 0.092 | 0.000 | 0.000 | 100 |
| Example 1 | 89.038 | 9.245 | 0.080 | 0.075 | 0.295 | 0.548 | 0.349 | 0.282 | 0.082 | 0.000 | 0.006 | 100 |
| Example 2 | 88.916 | 9.373 | 0.074 | 0.075 | 0.294 | 0.540 | 0.349 | 0.282 | 0.082 | 0.000 | 0.015 | 100 |
| Example 3 | 88.955 | 9.321 | 0.083 | 0.061 | 0.293 | 0.552 | 0.349 | 0.272 | 0.084 | 0.000 | 0.030 | 100 |
| Example 4 | 88.943 | 9.320 | 0.062 | 0.072 | 0.294 | 0.528 | 0.349 | 0.282 | 0.082 | 0.000 | 0.068 | 100 |
| Example 5 | 88.877 | 9.284 | 0.084 | 0.061 | 0.301 | 0.552 | 0.348 | 0.273 | 0.079 | 0.000 | 0.141 | 100 |
| Example 6 | 88.476 | 9.276 | 0.083 | 0.060 | 0.301 | 0.535 | 0.347 | 0.280 | 0.082 | 0.000 | 0.560 | 100 |
| Example 7 | 88.898 | 9.415 | 0.085 | 0.062 | 0.303 | 0.542 | 0.250 | 0.281 | 0.096 | 0.000 | 0.068 | 100 |
| Example 8 | 87.793 | 9.290 | 0.084 | 0.060 | 0.299 | 0.523 | 1.486 | 0.280 | 0.093 | 0.000 | 0.067 | 100 |
| Example 9 | 88.991 | 9.325 | 0.062 | 0.072 | 0.295 | 0.526 | 0.349 | 0.282 | 0.030 | 0.000 | 0.068 | 100 |
| Example 10 | 88.893 | 9.231 | 0.081 | 0.061 | 0.306 | 0.534 | 0.349 | 0.278 | 0.200 | 0.000 | 0.067 | 100 |
| Example 11 | 89.013 | 9.379 | 0.084 | 0.059 | 0.301 | 0.540 | 0.349 | 0.103 | 0.104 | 0.000 | 0.068 | 100 |
| Example 12 | 88.754 | 9.249 | 0.081 | 0.061 | 0.305 | 0.550 | 0.349 | 0.479 | 0.105 | 0.000 | 0.067 | 100 |
| Example 13 | 89.171 | 9.246 | 0.080 | 0.075 | 0.080 | 0.554 | 0.352 | 0.278 | 0.096 | 0.000 | 0.068 | 100 |
| Example 14 | 88.275 | 9.266 | 0.082 | 0.061 | 0.973 | 0.534 | 0.348 | 0.287 | 0.107 | 0.000 | 0.067 | 100 |
| Example 15 | 89.135 | 9.436 | 0.088 | 0.063 | 0.304 | 0.170 | 0.352 | 0.287 | 0.097 | 0.000 | 0.068 | 100 |
| Example 16 | 88.059 | 9.316 | 0.084 | 0.060 | 0.300 | 1.390 | 0.349 | 0.281 | 0.094 | 0.000 | 0.067 | 100 |

TABLE 2

| | Ferrite crystal grains Atomic ratios to the total number of Fe, Sr, Ca, and Si atoms (at %) | | | | | Multiple-crystal grain boundaries Atomic ratios to the total number of Fe, Sr, Ca, and Si atoms (at %) | | | | | | | |
|---|---|---|---|---|---|---|---|---|---|---|---|---|---|
| | Fe Mf1 | Sr Mr1 | Ca Mc1 | Si Ms1 | Total | Fe Gf1 | Sr Gr1 | Ca Gc1 | Si Gs1 | Total | Gc1/Gs1 = $(Ca/Si)_G$ | Gr1/Mr1 | Gc1/Mc1 |
|---|---|---|---|---|---|---|---|---|---|---|---|---|---|
| Comp. Ex. 1 | 92.90 | 4.56 | 0.43 | 2.11 | 100 | 0.69 | 15.11 | 41.33 | 42.87 | 100 | 0.96 | 3.31 | 96.1 |
| Example 1 | 92.78 | 4.56 | 0.43 | 2.23 | 100 | 0.68 | 14.04 | 36.54 | 48.74 | 100 | 0.75 | 3.08 | 85.0 |
| Example 2 | 92.66 | 4.57 | 0.43 | 2.34 | 100 | 0.67 | 12.78 | 32.41 | 54.14 | 100 | 0.60 | 2.80 | 75.4 |
| Example 3 | 92.48 | 4.58 | 0.44 | 2.50 | 100 | 0.65 | 11.75 | 29.02 | 58.58 | 100 | 0.50 | 157 | 66.0 |
| Example 4 | 92.31 | 4.59 | 0.44 | 2.66 | 100 | 0.64 | 11.04 | 24.79 | 63.53 | 100 | 0.39 | 2.41 | 56.3 |
| Example 5 | 92.49 | 4.58 | 0.45 | 2.48 | 100 | 0.65 | 10.46 | 20.02 | 68.87 | 100 | 0.29 | 2.28 | 44.5 |
| Example 6 | 92.55 | 4.59 | 0.47 | 2.39 | 100 | 0.62 | 9.84 | 14.09 | 75.45 | 100 | 0.19 | 2.14 | 30.0 |
| Example 7 | 92.43 | 4.59 | 0.43 | 2.55 | 100 | 0.64 | 10.82 | 26.92 | 61.62 | 100 | 0.44 | 2.36 | 62.6 |
| Example 8 | 92.30 | 4.57 | 0.45 | 2.68 | 100 | 0.64 | 10.34 | 20.52 | 68.50 | 100 | 0.30 | 2.26 | 45.6 |
| Example 9 | 92.38 | 4.59 | 0.44 | 2.59 | 100 | 0.66 | 10.74 | 26.63 | 61.97 | 100 | 0.43 | 2.34 | 60.5 |
| Example 10 | 92.43 | 4.59 | 0.44 | 2.54 | 100 | 0.65 | 10.70 | 20.51 | 68.14 | 100 | 0.30 | 2.33 | 46.6 |
| Example 11 | 92.37 | 4.59 | 0.45 | 2.59 | 100 | 0.62 | 10.99 | 24.51 | 63.88 | 100 | 0.38 | 2.39 | 54.5 |
| Example 12 | 92.54 | 4.59 | 0.43 | 2.44 | 100 | 0.65 | 11.03 | 24.81 | 63.51 | 100 | 0.39 | 2.40 | 57.7 |
| Example 13 | 92.74 | 4.61 | 0.47 | 2.18 | 100 | 0.72 | 14.53 | 39.96 | 44.79 | 100 | 0.89 | 3.15 | 85.0 |
| Example 14 | 92.08 | 4.57 | 0.44 | 2.91 | 100 | 0.58 | 9.21 | 9.03 | 81.18 | 100 | 0.11 | 2.02 | 20.5 |
| Example 15 | 92.53 | 4.59 | 0.22 | 2.66 | 100 | 0.68 | 12.09 | 10.22 | 77.01 | 100 | 0.13 | 2.63 | 46.5 |
| Example 16 | 92.26 | 4.59 | 0.71 | 2.44 | 100 | 0.64 | 10.67 | 38.06 | 50.63 | 100 | 0.75 | 2.32 | 53.6 |

TABLE 3

| | Ferrite crystal grains Atomic ratios to the total number of Fe, Sr, Ca, Si, and Zn atoms (at %) | | | | | | Multiple-crystal grain boundaries Atomic ratios to the total number of Fe, Sr, Ca, Si, and Zn atoms (at%) | | | | | |
|---|---|---|---|---|---|---|---|---|---|---|---|---|
| | Fe Mf2 | Sr Mr2 | Ca Mc2 | Si Ms2 | Zn Mz2 | Total | Fe Gf2 | Sr Gr2 | Ca Gc2 | Si Gs2 | Zn Gz2 | Total |
|---|---|---|---|---|---|---|---|---|---|---|---|---|
| Comp. Ex. 1 | 92.70 | 4.55 | 0.43 | 2.11 | 0.21 | 100 | 0.69 | 15.11 | 41.32 | 42.86 | 0.02 | 100 |
| Example 1 | 92.60 | 4.55 | 0.43 | 2.23 | 0.19 | 100 | 0.68 | 14.03 | 36.52 | 48.72 | 0.05 | 100 |
| Example 2 | 92.51 | 4.56 | 0.43 | 2.34 | 0.16 | 100 | 0.67 | 12.77 | 32.38 | 54.10 | 0.08 | 100 |
| Example 3 | 92.36 | 4.37 | 0.44 | 2.50 | 0.13 | 100 | 0.65 | 11.74 | 28.99 | 58.50 | 0.12 | 100 |
| Example 4 | 92.21 | 4.58 | 0.44 | 2.66 | 0.11 | 100 | 0.64 | 11.02 | 24.75 | 63.43 | 0.16 | 100 |
| Example 5 | 92.40 | 4.58 | 0.45 | 2.48 | 0.09 | 100 | 0.65 | 10.44 | 19.98 | 68.75 | 0.18 | 100 |
| Example 6 | 92.48 | 4.59 | 0.47 | 2.39 | 0.07 | 100 | 0.62 | 9.82 | 14.06 | 75.30 | 0.20 | 100 |

TABLE 3-continued

| | Ferrite crystal grains Atomic ratios to the total number of Fe, Sr, Ca, Si, and Zn atoms (at %) | | | | | | Multiple-crystal grain boundaries Atomic ratios to the total number of Fe, Sr, Ca, Si, and Zn atoms (at%) | | | | | |
|---|---|---|---|---|---|---|---|---|---|---|---|---|
| | Fe Mf2 | Sr Mr2 | Ca Mc2 | Si Ms2 | Zn Mz2 | Total | Fe Gf2 | Sr Gr2 | Ca Gc2 | Si Gs2 | Zn Gz2 | Total |
| Example 7 | 92.32 | 4.58 | 0.43 | 2.55 | 0.12 | 100 | 0.64 | 10.80 | 26.88 | 61.52 | 0.16 | 100 |
| Example 8 | 92.20 | 4.57 | 0.45 | 2.68 | 0.10 | 100 | 0.64 | 10.32 | 20.49 | 68.39 | 0.16 | 100 |
| Example 9 | 92.28 | 4.58 | 0.44 | 2.59 | 0.11 | 100 | 0.66 | 10.72 | 26.59 | 61.88 | 0.15 | 100 |
| Example 10 | 92.33 | 4.59 | 0.44 | 2.54 | 0.10 | 100 | 0.65 | 10.68 | 20.48 | 68.03 | 0.16 | 100 |
| Example 11 | 92.29 | 4.59 | 0.45 | 2.59 | 0.08 | 100 | 0.62 | 10.98 | 24.50 | 63.84 | 0.06 | 100 |
| Example 12 | 92.35 | 4.58 | 0.43 | 2.44 | 0.20 | 100 | 0.65 | 11.00 | 24.75 | 63.35 | 0.25 | 100 |
| Example 13 | 92.62 | 4.60 | 0.47 | 2.18 | 0.13 | 100 | 0.72 | 14.50 | 39.88 | 44.71 | 0.19 | 100 |
| Example 14 | 91.98 | 4.56 | 0.44 | 2.91 | 0.11 | 100 | 0.58 | 9.20 | 9.02 | 81.07 | 0.13 | 100 |
| Example 15 | 92.43 | 4.59 | 0.22 | 2.66 | 0.10 | 100 | 0.68 | 12.07 | 10.20 | 76.87 | 0.18 | 100 |
| Example 16 | 92.16 | 4.58 | 0.71 | 2.44 | 0.11 | 100 | 0.64 | 10.65 | 38.00 | 50.56 | 0.15 | 100 |

TABLE 4

| | Gc2/Gs2 | Gr2/Gz2 = $(Sr/Zn)_G$ | Gc2/Gz2 = $(Ca/Zn)_G$ | Mr2/Mz2 = $(Sr/Zn)_M$ | Mc2/Mz2 = $(Ca/Zn)_M$ | Mf2/Mz2 = $(Fe/Zr)_M$ | Gr2/Mr2 | Gz2/Mz2 | Gc2/Mc2 |
|---|---|---|---|---|---|---|---|---|---|
| Comp. Ex. 1 | 0.96 | 755.5 | 2066.0 | 21.7 | 2.05 | 441.4 | 3.32 | 0.10 | 96.1 |
| Example 1 | 0.75 | 280.6 | 730.4 | 23.9 | 2.26 | 487.4 | 3.08 | 0.26 | 84.9 |
| Example 2 | 0.60 | 159.6 | 404.8 | 28.5 | 2.69 | 578.2 | 2.80 | 0.50 | 75.3 |
| Example 3 | 0.50 | 97.8 | 241.6 | 35.2 | 3.38 | 710.5 | 2.57 | 0.92 | 65.9 |
| Example 4 | 0.39 | 68.9 | 154.7 | 41.6 | 4.00 | 838.3 | 2.41 | 1.45 | 56.3 |
| Example 5 | 0.29 | 58.0 | 111.0 | 50.9 | 5.00 | 1026.7 | 2.28 | 2.00 | 44.4 |
| Example 6 | 0.19 | 49.1 | 70.3 | 65.6 | 6.71 | 1321.1 | 2.14 | 2.86 | 29.9 |
| Example 7 | 0.44 | 67.5 | 168.0 | 38.2 | 3.58 | 769.3 | 2.36 | 1.33 | 62.5 |
| Example 8 | 0.30 | 64.5 | 128.1 | 45.7 | 4.50 | 922.0 | 2.26 | 1.60 | 45.5 |
| Example 9 | 0.43 | 71.5 | 177.3 | 41.6 | 4.00 | 838.9 | 2.34 | 1.36 | 60.4 |
| Example 10 | 0.30 | 66.8 | 128.0 | 45.9 | 4.40 | 923.3 | 2.33 | 1.60 | 46.5 |
| Example 11 | 0.38 | 183.0 | 408.3 | 57.4 | 5.63 | 1153.6 | 2.39 | 0.75 | 54.4 |
| Example 12 | 0.39 | 44.0 | 99.0 | 22.9 | 2.15 | 461.8 | 2.40 | 1.25 | 57.6 |
| Example 13 | 0.89 | 76.3 | 209.9 | 35.4 | 3.62 | 712.5 | 3.15 | 1.46 | 84.9 |
| Example 14 | 0.11 | 70.8 | 69.4 | 41.5 | 4.00 | 836.2 | 2.02 | 1.18 | 20.5 |
| Example 15 | 0.13 | 67.1 | 56.7 | 45.9 | 2.20 | 924.3 | 2.63 | 1.80 | 46.4 |
| Example 16 | 0.75 | 71.0 | 253.3 | 41.6 | 6.45 | 837.8 | 2.33 | 1.36 | 53.5 |

TABLE 5

| | Magnetic properties | | | |
|---|---|---|---|---|
| | Br mT | HcJ kA/m | Hk/HcJ % | Strength σ N/mm² |
| Comp. Ex. 1 | 447.2 | 180.9 | 76.7 | 145 |
| Example 1 | 446.2 | 260.0 | 85.5 | 176 |
| Example 2 | 445.8 | 284.8 | 89.3 | 180 |
| Example 3 | 450.2 | 281.9 | 91.7 | 185 |
| Example 4 | 453.1 | 280.5 | 93.3 | 189 |
| Example 5 | 450.7 | 288.3 | 91.1 | 188 |
| Example 6 | 440.1 | 295.2 | 90.5 | 186 |
| Example 7 | 452.2 | 280.1 | 91.2 | 174 |
| Example 8 | 450.1 | 289.5 | 90.1 | 188 |
| Example 9 | 453.1 | 285.0 | 93.3 | 172 |
| Example 10 | 450.3 | 288.7 | 90.3 | 185 |
| Example 11 | 445.3 | 301.2 | 92.2 | 181 |
| Example 12 | 451.8 | 271.4 | 89.7 | 189 |
| Example 13 | 452.4 | 260.1 | 85.1 | 177 |
| Example 14 | 420.2 | 298.6 | 95.1 | 175 |
| Example 15 | 440.1 | 264.2 | 92.9 | 172 |
| Example 16 | 452.8 | 263.3 | 86.3 | 182 |

As shown in Table 1 to Table 5, the ferrite sintered magnets of Examples had a residual magnetic flux density (Br) of 420 mT or more. Further, the coercive force (HcJ) was 260 kA/m or more, and the squareness ratio (Hk/HcJ) was 85% or more. Further, the strength σ was 172 N/mm² or more. That is, it was confirmed that the ferrite sintered magnets of the above embodiments exhibit excellent magnetic properties and strength when $0.1 < (Ca/Si)_G < 0.9$.

REFERENCE SIGNS LIST

4: M-type ferrite crystal grains (main phase), 6: grain boundaries, 6a: two-crystal grain boundaries, 6b: multiple-crystal grain boundaries, 100: ferrite sintered magnet.

What is claimed is:

1. A ferrite sintered magnet comprising:
   M-type ferrite crystal grains; and
   multiple-crystal grain boundaries surrounded by three or more of the M-type ferrite crystal grains,
   wherein the ferrite sintered magnet contains at least Fe, Ca, B, and Si,
   the ferrite sintered magnet contains 0.005 to 0.9 mass % of B in terms of $B_2O_3$,
   the multiple-crystal grain boundaries contain Si and Ca, and
   in a case where the molar ratio of Ca to Si in the multiple-crystal grain boundaries is represented by $(Ca/Si)_G$, the following formula is satisfied.

$$0.1 < (Ca/Si)_G < 0.9$$

2. The ferrite sintered magnet according to claim 1, wherein $0.1 < (Ca/Si)_G < 0.5$ is further satisfied.

3. The ferrite sintered magnet according to claim 1, wherein the M-type ferrite crystal grains are Sr ferrite crystal grains and the multiple-crystal grain boundaries contain Sr.

4. The ferrite sintered magnet according to claim 3, wherein when a ratio of the number of Ca atoms to the total number of Fe, Sr, Ca, and Si atoms in the M-type ferrite crystal grains is Mc1, and a ratio of the number of Ca atoms to the total number of Fe, Sr, Ca, and Si atoms in the multiple-crystal grain boundaries is Gc1, the following formula is satisfied.

$$20 < Gc1/Mc1 < 90$$

5. The ferrite sintered magnet according to claim 4, wherein $20 < Gc1/Mc1 < 70$ is further satisfied.

6. The ferrite sintered magnet according to claim 4, wherein when a ratio of the number of Sr atoms to the total number of Fe, Sr, Ca, and Si atoms in the M-type ferrite crystal grains is Mr1, and a ratio of the number of Sr atoms to the total number of Fe, Sr, Ca, and Si atoms in the multiple-crystal grain boundaries is Gr1, the following formula is satisfied.

$$2.0 < Gr1/Mr1 < 3.2$$

7. The ferrite sintered magnet according to claim 3, wherein the Sr ferrite crystal grains contain Zn and the multiple-crystal grain boundaries contain Zn.

8. The ferrite sintered magnet according to claim 7, wherein when a ratio of the number of Zn atoms to the total number of Fe, Sr, Ca, Si, and Zn atoms in the M-type ferrite crystal grains is Mz2, and a ratio of the number of Zn atoms to the total number of Fe, Sr, Ca, Si, and Zn atoms in the multiple-crystal grain boundaries is Gz2, the following formula is satisfied.

$$0.2 < Gz2/Mz2 < 2.9$$

9. The ferrite sintered magnet according to claim 7, wherein when a molar ratio of Sr to Zn in the multiple-crystal grain boundaries is $(Sr/Zn)_G$, the following formula is satisfied.

$$40 < (Sr/Zn)_G < 700$$

10. The ferrite sintered magnet according to claim 7, wherein when a molar ratio of Ca to Zn in the multiple-crystal grain boundaries is $(Ca/Zn)_G$, the following formula is satisfied.

$$50 < (Ca/Zn)_G < 2000$$

11. The ferrite sintered magnet according to claim 7, wherein in a case where a molar ratio of Sr to Zn in the M-type ferrite crystal grains is represented by $(Sr/Zn)_M$, the following formula is satisfied.

$$22 < (Sr/Zn)_M < 70$$

12. The ferrite sintered magnet according to claim 7, wherein when a molar ratio of Ca to Zn in the M-type ferrite crystal grains is $(Ca/Zn)_M$, the following formula is satisfied.

$$2.1 < (Ca/Zn)_M < 7.0$$

13. The ferrite sintered magnet according to claim 7, wherein when a molar ratio of Fe to Zn in the M-type ferrite crystal grains is $(Fe/Zn)_M$, the following formula is satisfied.

$$460 < (Fe/Zn)_M < 1500$$

14. The ferrite sintered magnet according to claim 7, wherein in the ferrite sintered magnet, a content of Si is 0.05 to 1.3 mass % in terms of $SiO_2$, a content of Ca is 0.15 to 2.0 mass % in terms of CaO, a content of Zn is 0.01 to 1.47 mass % in terms of ZnO, a content of Mn is 0.25 to 1.5 mass % in terms of MnO, and a content of Cr is 0.03 to 0.2 mass % in terms of $Cr_2O_3$.

15. The ferrite sintered magnet according to claim 1, wherein the ferrite sintered magnet does substantially not contain La or Co.

16. A rotary electrical machine comprising the ferrite sintered magnet according to claim 1.

* * * * *